United States Patent
Lammert et al.

[19]

[11] Patent Number: 5,990,427
[45] Date of Patent: Nov. 23, 1999

[54] MOVABLE ACCELERATION SWITCH RESPONSIVE TO ACCELERATION PARALLEL TO PLANE OF SUBSTRATE UPON WHICH THE SWITCH IS FABRICATED AND METHODS

[75] Inventors: Michael Dean Lammert, Manhattan Beach; George William McIver, Redondo Beach, both of Calif.

[73] Assignee: TRW Inc., Lyndhurst, Ohio

[21] Appl. No.: 09/177,938

[22] Filed: Oct. 23, 1998

[51] Int. Cl.[6] .................................................. H01H 35/14
[52] U.S. Cl. ................................. 200/61.53; 73/514.36; 200/61.45 M
[58] Field of Search ............................. 73/488, 514.01, 73/514.15, 514.16, 514.24, 514.29, 514.35–514.38; 180/268, 271, 281, 282, 286; 200/61.45 R–61.45 M; 280/735, 806; 307/9.1, 10.1, 116, 119–124; 701/1, 29, 31, 34, 36, 45

[56] References Cited

U.S. PATENT DOCUMENTS

| | | | |
|---|---|---|---|
| 4,543,457 | 9/1985 | Petersen et al. | 200/83 N |
| 4,855,544 | 8/1989 | Glenn | 200/61.45 R |
| 5,001,933 | 3/1991 | Brand | 73/651 |
| 5,177,331 | 1/1993 | Rich et al. | 200/61.45 R |
| 5,231,879 | 8/1993 | Yamamoto | 73/517 R |
| 5,387,819 | 2/1995 | Ueno et al. | 307/10.1 |
| 5,511,421 | 4/1996 | Kudo | 73/514.32 |
| 5,541,437 | 7/1996 | Watanabe et al. | 257/417 |
| 5,561,248 | 10/1996 | Negoro | 73/514.32 |
| 5,756,901 | 5/1998 | Kurle et al. | 73/777 |
| 5,821,419 | 10/1998 | Mader et al. | 73/493 |
| 5,828,138 | 10/1998 | McIver et al. | 307/10.1 |

*Primary Examiner*—Michael Friedhofer
*Attorney, Agent, or Firm*—Tarolli, Sundheim, Covell, Tummino & Szabo LLP

[57] ABSTRACT

A micro-miniature acceleration switch (240) has a substrate (242) and an inertial mass member ("IMM" 244) fabricated upon the substrate. The substrate (242) has a planar surface (246), and the IMM (244) can slide relative to the substrate from a first position to a second position when the switch (240) is accelerated along at least one direction parallel to the planar surface by acceleration of sufficient magnitude. Electrical contacts (e.g., 268) are fabricated upon the substrate (242) with at least one contact being coupled to the IMM (244). The contacts (268) move between closed and open positions when the IMM (244) slides between the first position and the second position. In one embodiment, an electrode (e.g., 292) provides an electrostatic force that opposes the acceleration forces and holds the IMM (244) in a holding position until overcome by the predetermined acceleration force. The predetermined acceleration force necessary to trigger the switch (240) may conveniently be adjusted by adjusting the electrostatic force applied by the electrode (292). The switch (240) is particularly useful as a safing switch in a system (140) for controlling a vehicle occupant protection device.

30 Claims, 4 Drawing Sheets

MOVABLE ACCELERATION SWITCH RESPONSIVE TO ACCELERATION PARALLEL TO PLANE OF SUBSTRATE UPON WHICH THE SWITCH IS FABRICATED AND METHODS

FIELD OF THE INVENTION

The subject invention relates to an acceleration-sensing switch that is fabricated using semiconductor and/or micro-machining technology. More particularly, the subject invention relates to a switch that is actuated by acceleration above a predetermined threshold amount and applied in a direction parallel to a plane of a substrate upon which the switch is fabricated. Further, the predetermined acceleration threshold amount may be electrically adjustable.

BACKGROUND OF THE INVENTION

Vehicle occupant protection systems have, in prior times, used a distributed array of inertia-operated mechanical switches to sense the onset of a collision and trigger the actuation of an occupant protection device (e.g., an air bag or a seat belt retractor). More recently, the type of system that is typically used in vehicles includes one or more electronic acceleration sensors working in cooperation with a microprocessor and sophisticated software. The sensors provide electronic signals proportional to vehicle acceleration. The microprocessor assesses the frequent and rapid changes in the vehicle's acceleration and determines whether a crash event is in progress that requires the actuation of the occupant protection system.

Protection systems using acceleration sensors typically still include one inertia-operated mechanical switch, usually referred to as a "safing switch", for providing a redundant level of detection of the crash event. The safing switch is designed and calibrated to close at a relatively early stage in a crash event. Closure of the safing switch is a necessary condition but not the sole determinant in controlling actuation of the occupant protection system, however. The occupant protection device (e.g., the air bag) is only actuated when the microprocessor determines that the severity of the crash is sufficient to warrant such actuation.

Safing switches presently in use employ an inertial mass that moves, upon vehicle deceleration, against the resilience of a spring. Electrical contacts associated with the switch are coupled to the mass in such a way that the contacts close when the mass moves a certain distance from its initial, or rest, position. Since the deceleration impulse representative of a significant crash varies from one vehicle type to another, the switch design often must be modified to some extent from one vehicle type to another such that the switch will, in each case, close at the appropriate time for that particular vehicle type. Normal manufacturing tolerances, however, still cause the switch actuation point to vary from switch to switch. Thus, each individual safing switch is calibrated during manufacture to "fine tune" the switch closure to the proper deceleration impulse point selected for that vehicle type.

Safing switches now in use are manufactured by processes generally similar to those used to assemble other small mechanical devices. Efforts have been made, however, to develop smaller switches that could be manufactured using techniques like those used to manufacture semiconductor components and/or micro-machined silicon elements. Patents describing such micro-machined switch devices include U.S. Pat. Nos. 5,177,331, 4,855,544, and 4,543,457.

U.S. Pat. No. 5,177,331 discloses an "impact sensor" formed of micro-machined silicon. The "impact sensor" includes contacts that close when the sensor is subjected to an impact. The sensor further includes electrodes between which an electrostatic field appears, creating a force tending to urge the contacts to close. When the contacts are in their unactuated position, the force is too small to perturb the contacts into the closed position. When the contacts close due to an impact, however, the nearness of the electrodes substantially increases the magnitude of the electrostatic field and the resulting force. The increased electrostatic force latches the contacts in the closed position until the field is released.

SUMMARY OF THE INVENTION

In accordance with one aspect, the present invention provides a micro-miniature acceleration switch. The switch includes a substrate having a planar surface and an inertial mass member ("IMM"). The IMM is fabricated upon the substrate and is transversely movable relative to the substrate from a first position to a second position when the switch is accelerated along at least one direction parallel to the planar surface of the substrate by acceleration of sufficient magnitude. Electrical contacts are fabricated upon the substrate. At least one of the contacts is coupled to the IMM. The electrical contacts move between closed and open positions when the IMM moves between the first position and second positions.

In accordance with another aspect, the present invention provides a switch that is adjustably responsive to an acceleration force. The switch includes a substrate having a planar surface and an inertial mass member ("IMM"). The IMM is slidable relative to the substrate from a hold position to an actuated position. The IMM is slidable when the switch is accelerated along at least one direction parallel to the planar surface of the substrate and is moved out of its hold position in response to the switch acceleration of sufficient magnitude. Electrical contacts are provided, with at least one of the contacts being coupled to the IMM. The contacts move between closed and open positions when the IMM moves between the hold position and the actuated position. Hold means of the switch include at least one hold electrode to which a hold voltage may be applied for adjustably establishing an electrostatic field creating a restraining force urging the IMM into its hold position. The restraining force has a magnitude functionally related to the hold voltage. The IMM remains in the hold position when the switch is subjected to acceleration force that is insufficient to overcome force tending to restrain the IMM to the hold position, including the restraining force established by the electrostatic field. The IMM slides to the actuated position when the switch is subjected to acceleration force that is sufficient to overcome the force tending to restrain the IMM. The acceleration along the at least one direction required to move relatively the IMM from the hold position to the actuated position may be adjusted by selecting the applied hold voltage.

In accordance with another aspect, the present invention provides a method of making a micro-miniature acceleration switch. A substrate is provided. The substrate has a planar surface. An inertia mass member ("IMM") is fabricated upon the substrate such that the IMM is free to slide along the substrate when the switch is accelerated along at least one direction parallel to the planar surface of the substrate by acceleration of sufficient magnitude. Electrical contacts are fabricated upon the substrate such that at least one electrical contact is coupled with the IMM, and at least one contact is adjacent to the IMM and coupled with the substrate, and such that the contacts are relatively movable between closed and open positions when the IMM moves between the first and second positions.

In accordance with another aspect, the present invention provides a system for recognizing the onset of a crash of a vehicle and providing a control signal indicative thereof. An accelerometer is responsive to crash acceleration of the vehicle and provides a crash acceleration signal that varies as a continuous function of the crash acceleration. Microprocessor means, responsive to the crash acceleration signal, determines from the signal whether the vehicle is experiencing a crash condition. A safing switch is responsive to crash acceleration of the vehicle. The safing switch includes a substrate that has a planar surface, and an inertial mass member ("IMM"). The IMM is fabricated upon the substrate and is movable in a transverse direction relative to the substrate from a first position to a second position when the switch is accelerated along at least one direction parallel to the planar surface of the substrate by acceleration of sufficient magnitude. Electrical contacts are fabricated upon the substrate and at least one of the contacts is coupled to the IMM. The contacts move between closed and open positions when the IMM moves between the first position and second positions.

In accordance with another aspect, the present invention provides a method of deploying an occupant protection apparatus in a vehicle as a function of the crash acceleration experienced by the vehicle. A control circuit is provided for assessing changes in the acceleration experienced by the vehicle. The control circuit includes a safing switch that has an inertial mass member ("IMM") slidable relative to a planar-extending substrate upon which the IMM is fabricated. The IMM slides in a plane parallel to the extent of the substrate in response to a predetermined crash acceleration applied to the control circuit in a direction parallel to the extent of the substrate and above a predetermined amount to provide an electrical signal indicating a crash event. An electrostatic force is applied to the IMM to urge the IMM in the direction opposite the direction of acceleration movement of the safing switch. The applied electrostatic force is selected according to the predetermined level of acceleration to which the switch is to be responsive. An electrical signal is provided when the IMM slides in response to acceleration of the switch greater than the predetermined crash acceleration level. The occupant crash protection apparatus is actuated when the electrical signal is provided by the IMM.

BRIEF DESCRIPTION OF THE DRAWINGS

The foregoing and other objects and advantages of the present invention will be better understood from the following description, appended claims, and accompanying drawings wherein:

DESCRIPTION OF PREFERRED EMBODIMENTS

Figure 1:
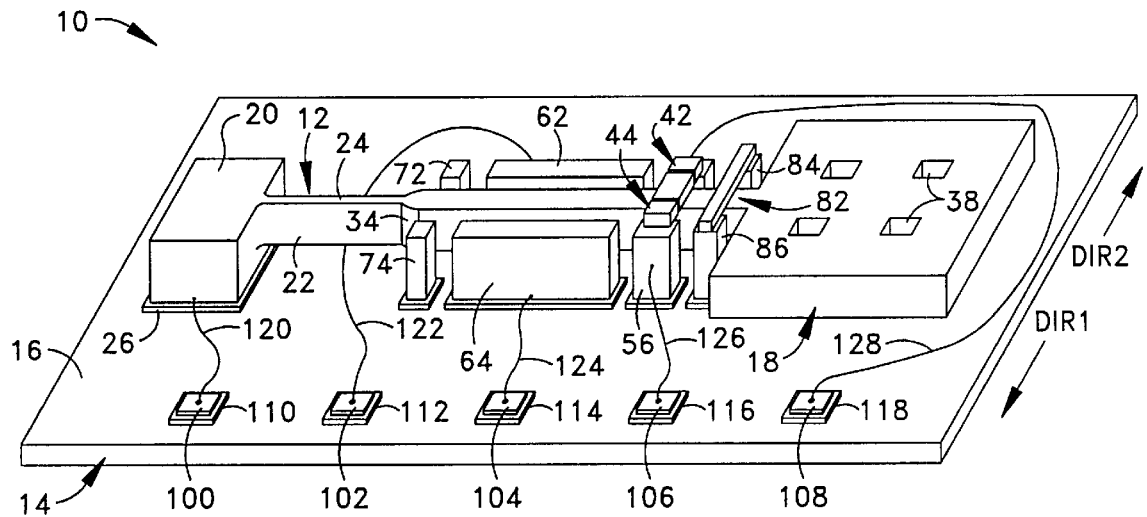
FIG. 1 is a perspective view of one embodiment of a safing switch incorporating the teachings of the present invention.

A safing switch 10 in accordance with the present invention is shown in the perspective view of FIG. 1. The safing switch 10 includes a cantilever mounted inertial mass member (IMM) 12 that is composed of plated metal, such as nickel, fabricated on a substrate 14. The substrate 14 is preferably made of a semiconductor material, such as oxidized silicon or gallium-arsenide, or an insulator material, such as glass or alumina. An upper (as viewed in FIG. 1) surface 16 of the substrate 14 extends in a plane, and the substrate has an overall planar configuration.

It is to be understood that certain direction-descriptive words (e.g., upper) are used herein for the purpose of ease in description and identification of various components of the safing switch 10, and are not intended limit the scope of the present invention. Thus, it is to be understood that the safing switch 10 could be oriented other than as shown in the Figures (e.g., inverted), without departing from the present invention.

The IMM 12 includes a mass platform 18 (FIG. 2) that is attached to a base support 20 by a flexible arm 22. In one embodiment, an upper extent of each of the mass platform 18, the base support 20, and the flexible arm 22 is defined by a single planar surface 24 of the IMM 12. The upper planar surface 24 of the IMM 12 is preferably parallel to the upper surface 16 of the substrate 14.

Figure 2:
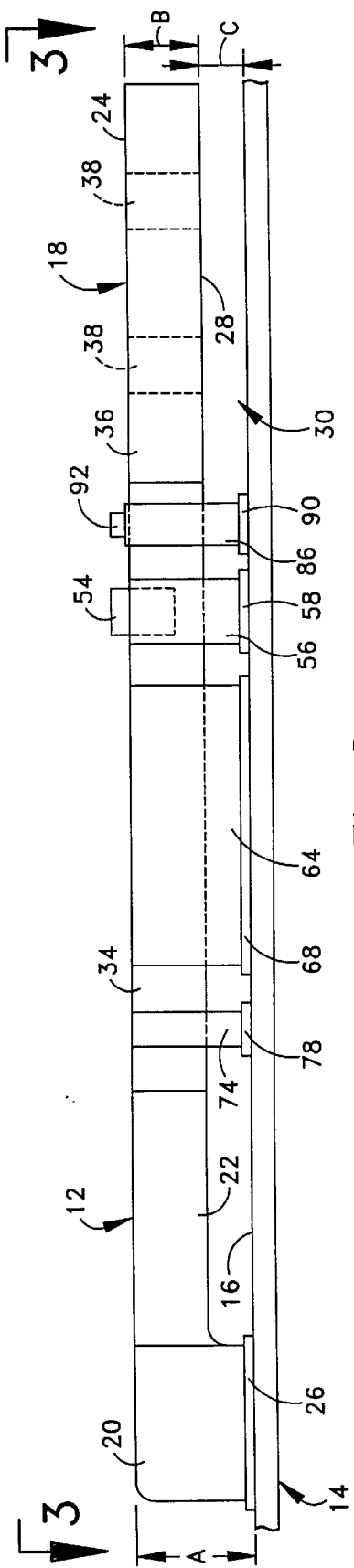
FIG. 2 is a side view of the safing switch of FIG. 1.

A lower extent of the base support 20 is affixed to the upper surface 16 of the substrate 14 by a thin adhesion layer 26 of material. Preferably, the material of the adhesion layer 26 is Cr—Au. As shown in FIG. 2, the overall height of the base support 20 and the adhesion layer 26 is a distance "A". Herein, it is to be understood that height measurements are taken in a direction orthogonal to the plane of the upper surface 16 of the substrate 14.

A lower extent of each of the of the mass platform 18 and the flexible arm 22 is defined by a single planar surface 28 of the IMM 12 that is parallel to the upper surface 16 of the substrate 14. Thus, the height (between lower and upper surfaces) of the mass platform 18 is equal to the height of the flexible arm 22. The height distance value of the mass platform 18 and the flexible arm 22 is designated "B". The distance B is less than the distance A such that an amount of air space 30 is located between the substrate 14 and both the mass platform 18 and the flexible arm 22. The height of the air space 30 is "C". The flexible arm 22 and the mass platform 18 extend out, over the upper surface 16 of the substrate 14, in a cantilever fashion from the base support 20.

The flexible arm 22 (FIG. 3) has a length "D" and a width "E". The width E of the arm 22 is less than the height B (FIG. 2) of the arm. Accordingly, the arm 22 is flexible in directions DIR1 and DIR2 (shown in FIG. 1 and parallel to the upper surface 16 of the substrate 14). The flexible arm 22 is sufficiently rigid to resist flexing in directions orthogonal to the substrate to maintain the mass platform 18 in a suspended position above the substrate. During flexing of the arm 22, the arm is deflected away from a neutral position (shown in FIG. 1).

The mass platform 18 has an elongated shank portion 34 that is connected to the flexible arm 22 and that extends for a length "F" (FIG. 2). A width "G" of the shank portion 34 is greater than the width E of the flexible arm 22. The width G of the shank portion 34 is preferably selected to be sufficiently large to resist flexing.

A head portion 36 (FIG. 3) of the mass platform 18 is located at a distal end of the shank portion 34, away from the flexible arm 22. The head portion 36 has a length "H" and a width "I". Also, in the illustrated embodiment, a plurality of holes 38 is provided. Each hole 38 extends through the head portion 36 in the orthogonal direction. The length H and width I, and the size of the holes 38 are predetermined such that the amount of material present in the head portion 36 of the mass platform 18 is a substantially greater than the amount of material present in the flexible arm 22. Accordingly, an acceleration force that is applied to the safing switch 10 in either the direction DIR1 or the direction DIR2 creates a moment arm from the base support 20 that causes the flexible arm 22 to flex.

Figure 3:
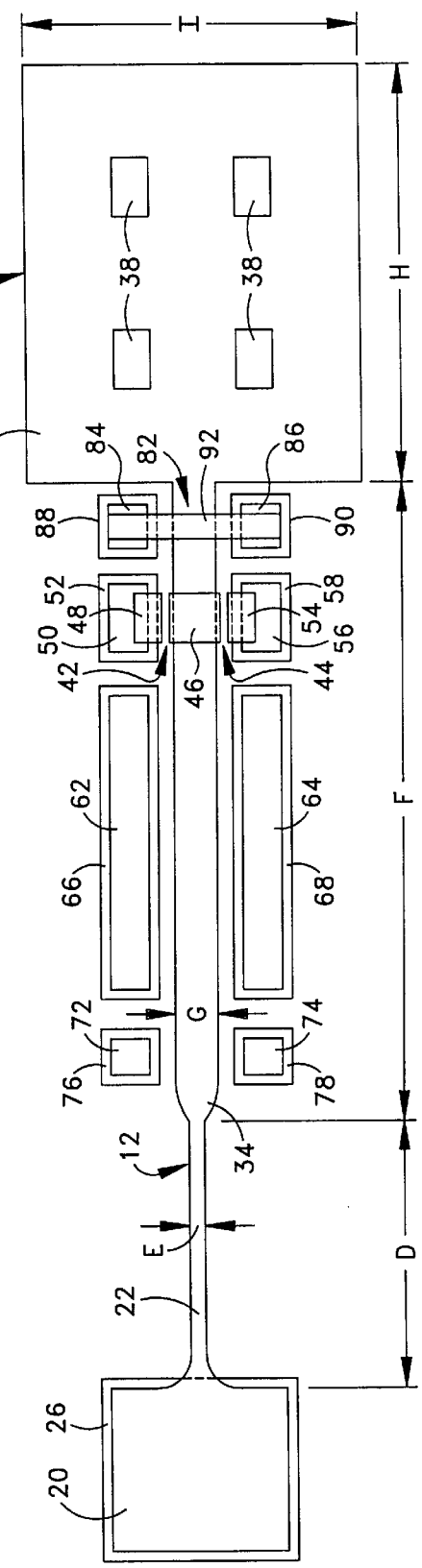
FIG. 3 is a top view of the safing switch of FIG. 2 taken along line 3—3 of FIG. 2.

The movement of the IMM 12 is in a plane that is parallel to the upper surface 16 of the substrate 14 (the substrate is not shown in FIG. 3 for clarity). The movement of the IMM 12 preferably has harmonic characteristics that are dependent upon the parameters of the IMM. Specifically, the flexible arm 22 has spring-like properties. A natural frequency of vibration is present and is dependent upon the parameters and material characteristics of the IMM 12 (e.g., the natural frequency of vibration of the IMM is related to the spring constant and length D of the flexible arm 22, and the mass distribution of the IMM). The frequency can be changed in several ways, e.g., by changing the mass of the mass platform 18 through the addition to the mass platform of a mass (not shown) of a suitable size. Once the safing switch 10 is fabricated, however, the natural frequency of vibration of the IMM 12 is fixed.

The cantilever mounting of the IMM 12 (FIG. 1) permits it to respond to the application of force in either the direction DIR1 or the direction DIR2 by swinging in the plane parallel to the upper surface 16 of the substrate 14. More specifically, when the safing switch 10 is accelerated in the direction DIR1, the mass platform 18 tends to move relative to the substrate 14 in the direction DIR2 away from the neutral position. When the safing switch 10 is accelerated in the direction DIR2, the mass platform 18 tends to move relative to the substrate 14 in the direction DIR1 away from the neutral position. Herein, acceleration-induced movement away from the neutral position is sometimes referred to as "deflection".

The safing switch 10 is equipped with at least one pair (e.g., 42) of electrical contacts that close when a certain amount of deflection of the mass platform 18 occurs relative to the substrate 14. Within certain limits, the movement of the IMM 12 is related to the amount of acceleration applied to the sating switch 10. Thus, it is intended that the at least one contact pair closes when the safing switch 10 is exposed to acceleration above a predetermined threshold amount.

Preferably, two pairs (i.e., first and second pairs) 42 and 44 of electrical contacts are provided, and the electrical contacts are made of gold. In one embodiment, the electrical contact pairs 42, 44 are associated with the shank portion 34 at a location near the head portion 36. The first contact pair 42 is positioned to close upon the occurrence of sufficient acceleration of the safing switch 10 in the direction DIR1 and the second contact pair 44 is positioned to close upon the occurrence of sufficient acceleration of the safing switch in the direction DIR2.

A contact member 46 (FIG. 3) is part of each of the first and second contact pairs 42 and 44 (i.e., the contact member provides one-half of each contact pair). The contact member 46 is affixed to the upper surface 24 of the IMM 12 at the shank portion 34. A width of the contact member 46 is greater than the width G of the shank portion, such that the contact member 46 extends beyond the shank portion on both sides of the shank portion.

The other (i.e., second) half 48 of the first contact pair 42 is located adjacent to the contact member 46 on the shank portion 34 of the IMM 12. A contact support 50 holds the second half 48 of the first contact pair 42 in alignment/registration with the contact member 46. The second half 48 extends toward the contact member 46, beyond the contact support 50.

The contact support 50 is made of a conductive material such as metal (e.g., nickel). An adhesion layer 52 connects the contact support 50 to the substrate 14. The adhesion layer 52 is preferably made of the same material as the adhesion layer 26 for the base support 20.

The second half 54 of the second contact pair 44 is located adjacent to, and in alignment/registration with, the other end of the contact member 46. Similar to the second half 48 of the first contact pair 42, the second half 54 of the second contact pair 44 is supported by a contact support 56. In turn, the contact support 56 is connected to the substrate 14 via an adhesion layer 58. Accordingly, the second half 48 of the first contact pair 42 and the second half 54 of the second contact pair 44 are fixed relative to the substrate 14.

When the IMM 12 is in the neutral position, air space exists between the contacts of the first contact pair 42 and the contacts of the second contact pair 44. The electrical resistance that exists between the contacts of each pair is normally very high (effectively infinite). When the sating switch 10 is subject to acceleration in either direction DIR1 or DIR2 (e.g., parallel to the plane of the substrate 14) of sufficient magnitude, the flexing of the flexible arm 22 causes one of the contact pairs to meet, thereby creating a short circuit at that contact pair. Thus, in accordance with one embodiment of the present invention, the safing switch 10 is normally "open", but "closes" when subject to acceleration above a predetermined threshold amount.

The safing switch 10 includes two electrodes 62 and 64 that extend along the shank portion 34 of the IMM 12. The first electrode 62 is located on the first side of the IMM 12, adjacent to the shank portion 34 and spaced from the shank portion. The second electrode 64 is located on the second side of the IMM 12, adjacent to the shank portion 34 and spaced from the shank portion. The first and second electrodes 62 and 64 are made of a conductive material such as metal (e.g., nickel). The first electrode 62 is connected to the substrate 14 via an adhesion layer 66, and the second electrode 64 is connected to the substrate 14 via an adhesion layer 68.

One or both of the electrodes 62, 64 apply an electrostatic field to the shank portion 34 of the IMM 12. Application of an electrostatic field imposes a holding force on the IMM 12. The holding force is adjustable via adjustment of the electrostatic field. Thus, the electrostatic field, provided via the electrodes 62, 64, permits adjustment/calibration of the amount of acceleration force necessary to cause one of the contact pairs (e.g., the first contact pair 42) to close.

Also, one or both of the electrodes 62, 64 apply an electrostatic test field to the shank portion 34 of the IMM 12. The test field causes the IMM 12 to move during a test scenario. The imposed test field simulates an applied acceleration force. It is to be noted that either one of the electrodes (e.g., 62) can be employed to apply the electrostatic holding force field. The other electrode (e.g., 64) can be employed to apply the electrostatic test field. In other words, the two electrodes 62, 64 have interchangeable functions.

Optional stops are provided in the safing switch 10 to constrain movement of the IMM 12. Specifically, a first lateral stop 72 is positioned on the first side of the IMM 12, adjacent to the shank portion 34. The first stop 72 is spaced from the shank portion 34 in the direction DIR2 when the IMM 12 is in the neutral position. A second lateral stop 74 is positioned on the second side of the IMM 12, adjacent to the shank portion 34. The second stop 74 is spaced from the shank portion 34 in the direction DIR1 when the IMM 12 is in the neutral position. Preferably, the lateral stops 72, 74 are located near the end of the shank portion 34 that is connected to the flexible arm 22.

Preferably, the lateral stops 72, 74 are made of a metal (e.g., nickel), and are adhered to the substrate 14 by adhesion layers 76, 78 (i.e., the stops are fixed relative to the substrate). Each lateral stop (e.g., 72) prevents movement of the IMM 12 beyond an amount that is necessary for a respective contact pair (e.g., 42) to close. One benefit of the lateral stops 72, 74 is that undue force is not applied against the contacts 42, 44 and the contact supports 50, 56 during movement of the IMM 12. Another benefit of the lateral stops 72, 74 is that contact between the shank portion 34 and the electrodes 62, 64 is prevented.

A vertical stop arrangement 82 (FIG. 1) is also optionally provided on the safing switch 10. The vertical stop arrangement 82 includes two support members 84, 86 located adjacent to the shank portion 34. The first support member 84 is located on the first side of the shank portion 34 and the second support member 86 is located on the second side of the shank portion. Preferably, the support members 84, 86 are made of metal (e.g., nickel). The support members 84, 86 (FIG. 3) are affixed to the substrate 14 via adhesion layers 88 and 90, respectively. Thus, the entire vertical stop arrangement 82 is fixed relative to the substrate 14.

A vertical stop member 92 of the vertical stop arrangement 82 is affixed to upper ends of the support members 84, 86, and extends over a segment of the shank portion 34. In one embodiment, the vertical stop member is made of metal (e.g., nickel). The vertical stop member 92 is in close proximity to the shank portion 34, but normally does not engage the shank portion. When the safety switch 10 is subject to a force which is orthogonal to the plane of the substrate 14 that urges the mass platform 18 upward, the vertical stop arrangement 82 limits the amount of vertical movement. One benefit of the vertical stop arrangement 82 is to prevent undue movement and to maintain the components of the safing switch 10 in proper registration.

Electrical bonding pads 100–108 (only shown in FIG. 1 for simplicity) are provided in the safing switch 10 to connect the several components of the safing switch to appropriate external circuitry. Each bonding pad is made of a conductive material (e.g., gold). Preferably, each bonding pad 100–108 is affixed to the substrate by an adhesion layer (e.g., Cr—Au) 110–118.

Turning now to the specifics of the connections, the first bonding pad 100 is electrically connected, via an electrical trace 120 (this and all other electrical traces are schematically shown), to the base support 20. Electrical traces are preferably made from the adhesion layer metal (e.g., Cr—Au). Accordingly, the IMM 12 and the contact member 46 are electrically connected to the first bonding pad 100. The second bonding pad 102 is electrically connected, via an electrical trace 122, to the first electrode 62. The third bonding pad 104 is electrically connected, via an electrical trace 124, to the second electrode 64. The fourth bonding pad 106 is electrically connected, via an electrical trace 126, to the contact support 56 and the second half 54 of the second contact pair 44. The fifth bonding pad 108 is electrically connected, via an electrical trace 128, to the contact support 50 and the second half 48 of the first contact pair 42.

Figure 4:
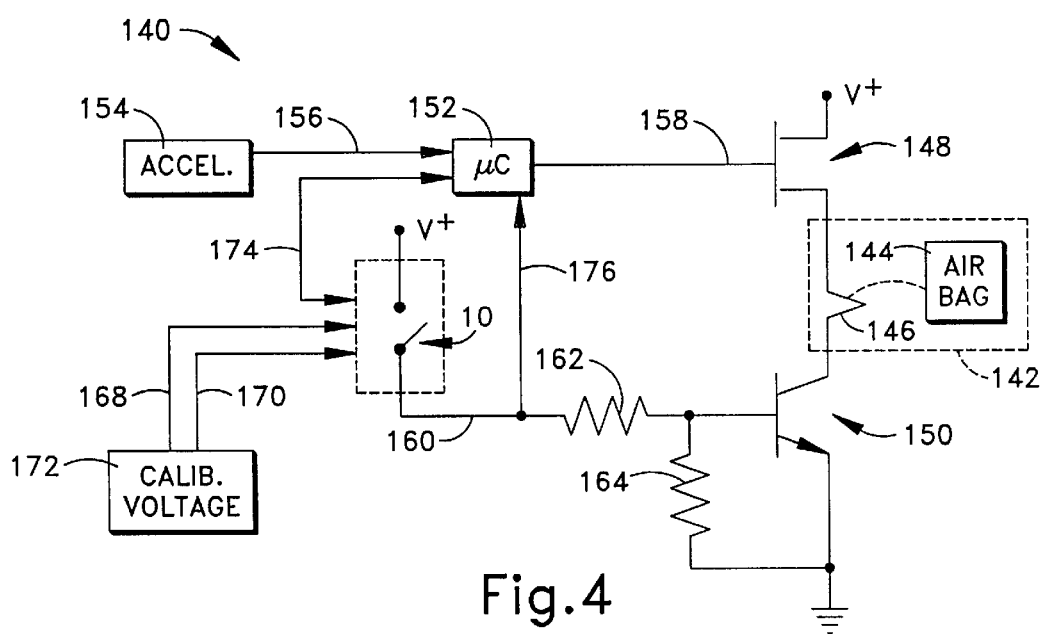
FIG. 4 is a schematic circuit diagram of an occupant protection system that incorporates the safing switch of FIG. 1.

Electrical connections to the bonding pads 100–108 are used to connect the safing switch 10 into a system 140 (FIG. 4) in accordance with the present invention. The system 140 is preferably a vehicle occupant protection system for use in a vehicle, and includes an actuatable occupant protection device 142. Preferably, the occupant protection device 142 includes an air bag module 144 with an inflatable air bag. The system 140 includes a control arrangement that controls a supply of electrical current to an initiator 146 of the protection device 142. Preferably, the initiator 146 is a squib. The squib 146 includes a material that ignites when current of certain magnitude and duration is channeled through the squib. Ignition of the squib 146 causes deployment of the air bag, as will be understood by those skilled in the art.

The squib 146 is connected in series with two electronic switches 148 and 150 across a power source V+ (not shown, per se). As illustrated, the HIGH side switch 148 is a field effect transistor ("FET") or similar device and the LOW side switch 150 is an "NPN" bipolar junction transistor ("BJT") or similar device. When either of the two transistors 148, 150 is in its "OFF" or "HIGH" impedance state, no current passes through the squib 146. Thus, the squib 146 only receives enough current to ignite if both transistors 148, 150 are in their "ON" or "LOW" impedance states.

The transistor 148 is controlled by a microcomputer 152. An accelerometer 154 senses vehicle acceleration and provides to the microcomputer 152 an analog or digital signal 156 having a value indicative of the magnitude of acceleration experienced by the vehicle on which the system 140 is mounted. The microcomputer 152 analyzes the acceleration using software algorithms to determine whether the vehicle is experiencing a deployment crash condition. Such algorithms are known in the art and are not disclosed herein for brevity. When the microcomputer 152 determines that the vehicle is experiencing acceleration of size and character sufficient to warrant deployment of the occupant protection device 142, the microcomputer provides a signal on an output line 158 to switch the transistor 150 from its "OFF" state to its "ON" state.

The LOW side transistor 150 is controlled by the safing switch 10 (schematically represented in FIG. 4 as a signal-pole single-throw switch) in accordance with one aspect of the present invention. The safing switch 10 provides an open or closed current path between a power source (e.g., V+) and an output line 160. The output line 160 is connected to the base of the transistor 150 through a current limiting resistor 162. The base of the transistor 150 is also connected to ground through a pull-down resistor 164. When the safing switch 10 is open, the base of the transistor 150 is pulled to a ground voltage level by the pull-down resistor 164 and the transistor is "OFF". When the safing switch 10 is closed, however, current is supplied to the base of the transistor 150. Thus, when either pair of contacts (e.g., 42, FIG. 1) is closed, base current is supplied to the transistor 150 (FIG. 4) and the transistor is turned "ON". As discussed above, one of the contact pairs 42, 44 close when the safing switch 10 is subject to acceleration in one of its direction of sensitivity (e.g., DIR1 or DIR2) that is greater than a predetermined threshold amount.

The electrodes 62, 64 (not shown in FIG. 4 because of the schematic view) of the safing switch 10 are connected, via calibration lines 168, 170 to a calibration voltage source 172. The calibration voltage source 172 supplies predetermined calibration voltage(s) to one or both of the electrodes 62, 64. When the calibration voltage(s) are utilized, the trigger threshold of the safing switch 10 is set via such calibration voltage(s). Selection of the calibration voltage(s) is done during a calibration step performed as part of the manufacturing process.

During calibration, the calibration voltage is initially set to a high level. The safing switch 10 is then subjected (by means of centrifuge or a "bumper", for example) to the acceleration to which the switch is to be calibrated. The calibration voltage is then lowered until the safing switch 10 triggers. The calibration voltage at the triggering point is then the selected voltage. It may in some cases be desirable to design the voltage source so that it provides a higher voltage for a brief time upon system power up, then drops down to a selected calibration voltage.

Generally, the safing switch 10 is oriented relative to the vehicle such that its axis of sensitivity is parallel to a direction in which acceleration is to be sensed. Further, the axis of sensitivity of the accelerometer 154 and the axis of sensitivity of the safing switch 10 are parallel to each other. For example, if the occupant protection system 140 is to sense a frontal collision of the vehicle, the accelerometer 154 and the safing switch 10 are oriented such that their respective sensitive axes are aligned along the front-to-rear axis of the vehicle.

Each time power is applied to the control arrangement; the microcomputer 152 can preferably test the operation of the safing switch 10, via test communication 174, 176. The testing may include the application of the electrostatic test field to the IMM 12 via one of the electrodes 62, 64. Any suitable arrangement for testing operation of the safing switch 10 can be employed and suitable components added. Accordingly, such testing arrangements are not discussed herein for brevity.

Fabrication of the components of the thus described safing switch 10 occurs directly on the substrate 14. The fabrication is preferably done using micro-machining and semiconductor manufacture techniques.

Figure 5:
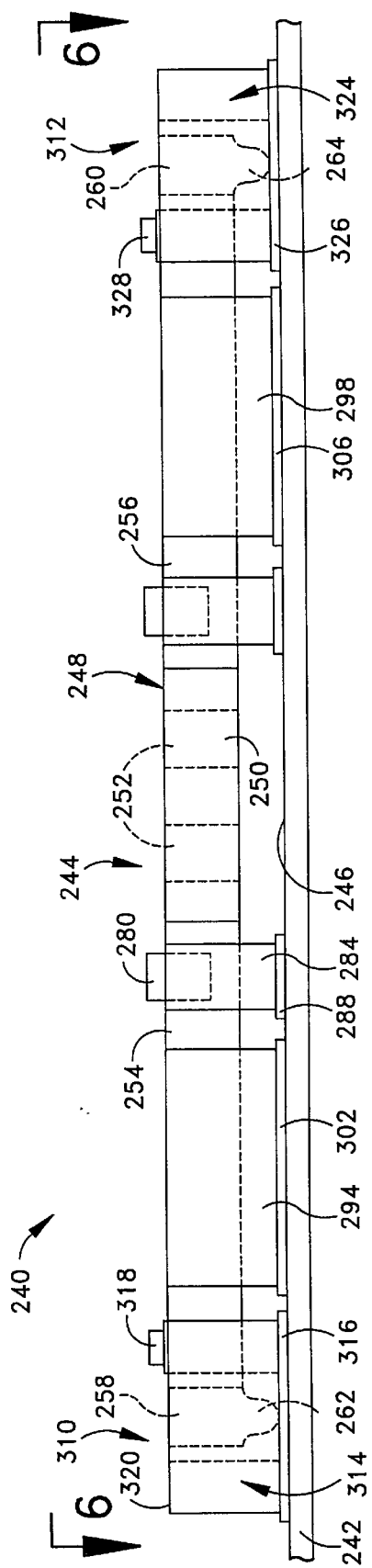
FIG. 5 is a side view of a second embodiment of a safing switch in accordance with the present invention.
Figure 6:
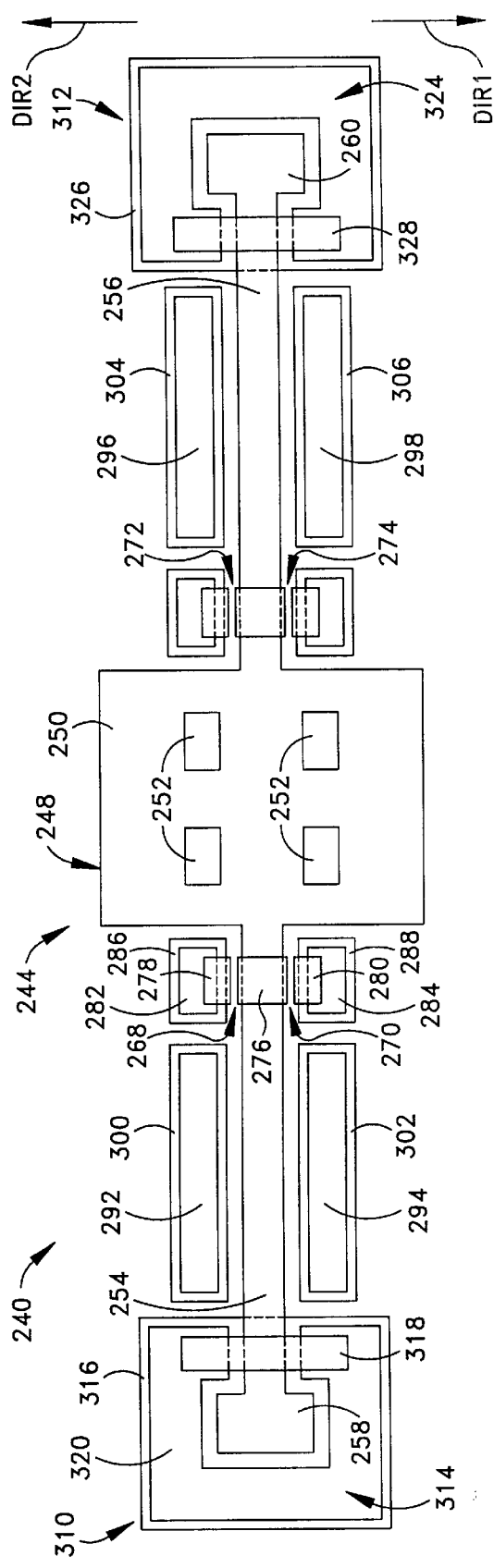
FIG. 6 is a top view of the safing switch of FIG. 5 taken along line 6—6 of FIG. 5.

Another embodiment of a safing switch 240 in accordance with the present invention is shown in FIGS. 5 and 6. The components of the safing switch 240 are fabricated on a substrate 242 (FIG. 5) that is preferably made of the same material as the substrate 14 of the first embodiment. Also, the fabrication of components for the second embodiment is similar to the fabrication of components for the first embodiment. However, the second embodiment differs from the first embodiment in that an IMM 244 of the second embodiment does not have a portion that is fixed relative to the substrate 242. In distinction, the IMM 244 of the second embodiment is entirely free to laterally move relative to the substrate 242 in a plane that is parallel to a planar upper surface 246 of the substrate. The movement is thus a transverse movement that can include sliding and/or tipping relative to the substrate to laterally displace the IMM 244 relative to the substrate 242.

Preferably, the IMM 244 is made of nickel. The IMM 244 has a mass platform 248 with a centrally located head portion 250 (FIG. 6). The head portion 250 may have any suitable size such that it is responsive to applied acceleration. Preferably, the head portion 250 has a plurality of holes 252 that extend through the head portion in a direction orthogonal to the plane of the substrate 242 (the substrate is not shown in FIG. 6 for clarity).

The mass platform 248 has two oppositely extending shank portions 254 and 256. The first shank portion 254 extends to the left (as viewed in FIGS. 5 and 6) from the head portion 250 and the second shank portion 256 extends to the right. Each shank portion (e.g., 254) has a smaller cross sectional area than that of the head portion 250. However, each shank portion (e.g., 254) has a sufficient cross sectional area such that flexing or bending of the shank portion is inhibited or limited.

At the distal end of the first shank portion 254, away from the head portion 250, is a first support portion 258 of the IMM 244, and at the distal end of the second shank portion 256 is a second support portion 260. Each support portion (e.g., 258) has a cross sectional area that is larger than the adjacent shank portion (e.g., 254). The support portion 258 has a downwardly extending bearing tip 262 (FIG. 5), and the support portion 260 has a similar bearing tip 264. The bearing tip (e.g., 262) of each support portion (e.g., 258) tapers to provide a somewhat blunt downwardly directed point.

The safing switch 240 includes four pairs of contacts 268–274 (FIG. 6). There are two contact pairs (e.g., 268 and 270) associated with each shank portion (e.g., 254) of the IMM 244. The first and second pair of contacts 268 and 270 are associated with the first shank portion 254.

The structure of the first and second contact pairs 268 and 270 and their relationship to the first shank portion 254 of the second embodiment is similar to the structure of the contact pairs 42, 44 (FIG. 1) and their relationship to the shank portion 34 of the first embodiment (FIG. 1). In view of this similarity, only a cursory discussion is provided for the first and second contact pairs 268 and 270 of the second embodiment (FIGS. 5 and 6).

For the first and second contact pairs 268 and 270, a contact member 276 (e.g., made of gold) is located on an upper surface of a segment of the shank portion 254. The contact member 276 has a width greater than the width of the first shank portion 254. Accordingly, the contact member 276 extends beyond the first shank portion 254 (i.e., above and below when viewed in FIG. 6). Second halves 278, 280 of the first and second contact pairs 268, 270 are located adjacent to and in registration with, the contact member 276. The second halves 278, 280 are affixed to contact supports 282, 284 (e.g., made of nickel), which are in turn fixed via adhesion layers 286, 288 (e.g., made of Cr—Au) to the upper surface 246 of the substrate 14.

When the safing switch 240 is subject to acceleration in the direction DIR1 above a predetermined threshold amount, the first contact pair 268 closes. When the safing switch 240 is subject to accelerated in the direction DIR2 above a predetermined threshold amount, the second contact pair 270 closes.

The third and fourth contact pairs 272 and 274 are constructed similar to the first and second contact pairs 268 and 270, and function in a manner similar to that for the first and second contact pairs. However, the third and fourth contact pairs 272 and 274 are arranged with respect to the second (right) shank portion 256. The components of the third and fourth contact pairs 272 and 274, the contact supports, and the adhesion layers are shown in FIGS. 5 and 6, but are not identified nor discussed for the purpose of brevity.

The safing switch 240 includes four electrodes 292–298 (e.g., made of nickel). The first and second electrodes 292, 294 are arranged adjacent to the first shank portion 254 and are affixed to the upper surface of the substrate 242 via adhesion layers 300 and 302, respectively. The relationship of the first and second electrodes 292 and 294, to the first shank portion 254 of the second embodiment is similar to the relationship of the electrodes 62, 64 (FIG. 1) to the shank portion 34 of the first embodiment (FIG. 1).

The third and fourth electrodes 296 and 298 (FIG. 6) are arranged with respect to the second shank portion 256. Adhesion layers 304 and 306 affix the third and fourth electrodes 296 and 298, respectively, to the upper surface 246 of the substrate 242. Thus, for each shank portion (e.g., 256), electrodes (e.g., 296 and 298) are arranged and function in a manner similar to the electrodes of the first embodiment (i.e., each provides an electrostatic holding force or an electrostatic test force).

Two retainer arrangements 310 and 312 are provided in the safing switch 240 of the second embodiment. Each retainer arrangement (e.g., 310) is associated with one of the support portions (e.g., 258) at the distal end of the respective shank portion (e.g., 254). Specifically, focusing on just the first (left) retainer arrangement 310, a retainer wall 314 extends in a general C-shape around the support portion 258. Preferably, the retainer wall 314 is made of nickel. An adhesion and bearing layer 316 affixes the retainer wall 314 to the substrate 242, and also provides a bearing surface for transverse (e.g., sliding and/or tipping) movement of the IMM 244. Preferably, the layer 316 is made of Cr—Au. The adhesion and bonding layer 316 is connected via a trace (not shown) to a bonding pad (not shown).

The associated shank portion 254 extends through a gap in the C-shaped retainer wall 314, with the tip 262 (FIG. 5) of the support portion 258 resting on the layer 316. The retainer wall 314 functions as a lateral direction retainer. Specifically, the amount of movement of the IMM 244 that is permitted in the plane parallel (i.e., a plane extending in the "X" and "Y" directions) to the upper surface 246 is limited by the retainer wall 314. Movement of the IMM 244 along an "X" direction (i.e., left and right, as viewed in FIG. 6) is stopped when the support portion 258 engages the retainer wall 314 (at the left or right side, as viewed in FIG. 6). Movement of the IMM 244 along a "Y" direction (i.e., up and down, as viewed in FIG. 6) is stopped when the support portion 258 engages the retainer wall 314 (at the upper or lower side, as viewed in FIG. 6) and/or the first shank portion 254 engages the retainer wall (at one of the wall ends defining the gap through which the shank portion extends). Thus, the "connection" between the IMM 244 and the retainer wall 314 is hinge-like.

A vertical retainer member 318 is located above the segment of the first shank portion 254 that extends through the gap in the retainer wall 314. The vertical retainer member 318 is affixed to an upper surface 320 of the retainer wall 314 at locations adjacent to each of the two ends of the retainer wall. A small air gap exists between the first shank portion 254 and the vertical retainer member 318 when the tip 262 of the IMM 244 is resting on the adhesion and bearing layer 316. The vertical retainer member 318 functions to constrain vertical movement of the IMM away from the substrate 242. The second retainer arrangement 312 has a retainer wall 324, an adhesion and bearing layer 326, and a vertical retainer member 328 that have structures and functions that are similar to their counterparts in the first retainer arrangement 312, but with respect to the second shank portion 256.

When the safing switch 240 is subject to an acceleration force in either the direction DIR1 or direction DIR2, the IMM 244 will tend to slide or tip relative to the substrate 242 and components fixed thereto. When the applied acceleration force exceeds a predetermined threshold, the IMM 244 moves (e.g., slides and/or tips) sufficiently far to close at least one of the contact pairs (e.g., 268). Similar to the first embodiment, the threshold level of acceleration to "activate" the safing switch of the second embodiment is adjustable (via the electrodes 292–298). Also, similar to the first embodiment, the safing switch 240 of the second embodiment can control the transistor 150 (FIG. 4) of the system 140. The safing switch 240 is connected into the system 140 via connections to bonding pads (not shown) of the safing switch in a manner similar to the first embodiment. One difference between the first and second embodiments is that the IMM 244 of the second embodiment does not have a portion that is in fixed electrical connection to a bonding pad. Instead, electrical current can pass between each support portion (e.g., 258) and the associated retainer arrangement (e.g., 310) and/or adhesion and bonding layer (e.g., 316).

Figure 7:
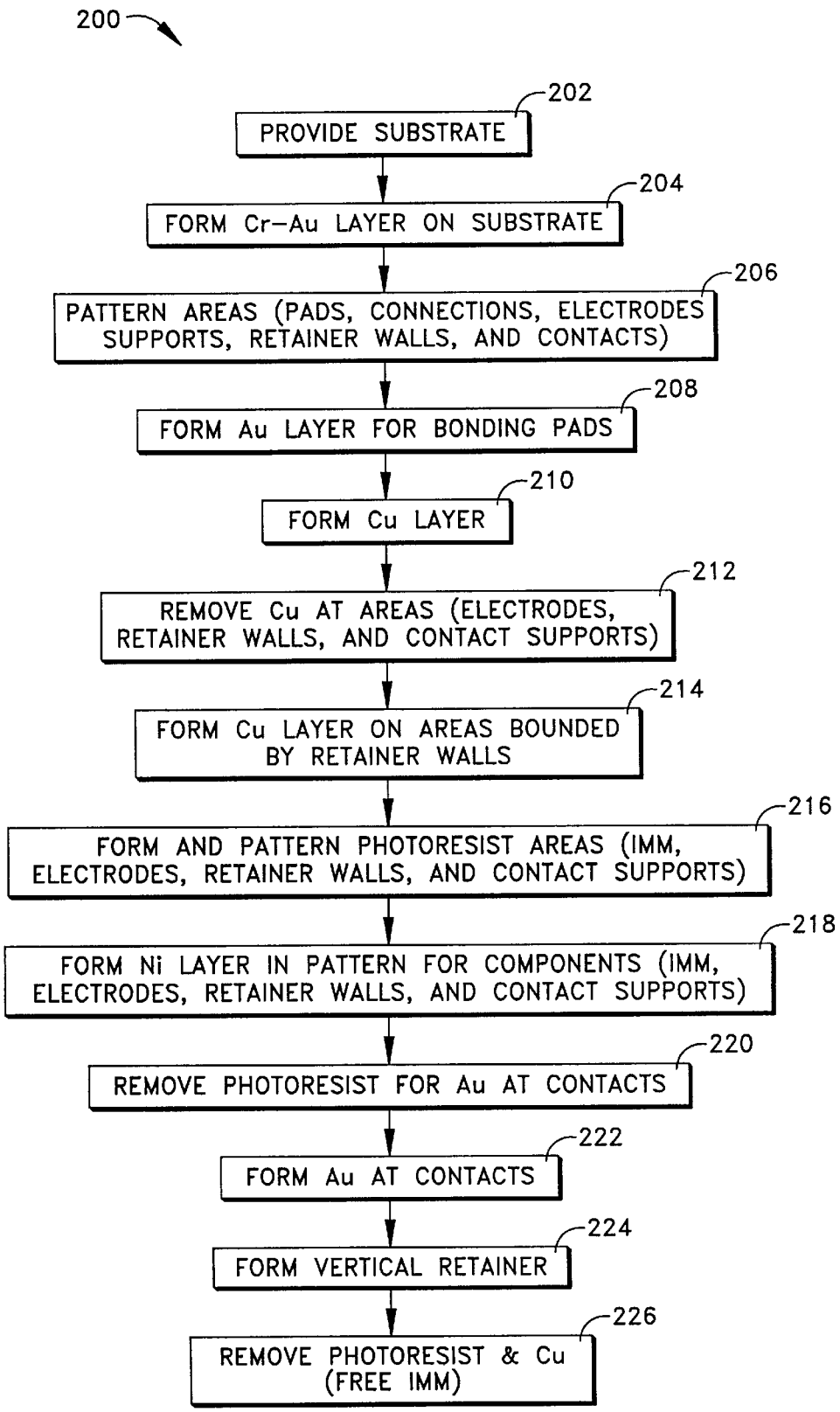
FIG. 7 is a flow chart for a process of making the safing switch of FIG. 5.

An example of a process 200 for providing the safing switch 240 in accordance with the present invention is set forth in FIG. 7. The process 200 begins at step 202, in which the substrate 14 is provided. At step 204, a layer of material is formed upon the substrate 14. The layer of material is the material which provides the adhesion layers (e.g., 286, 288, and 300–306), and the adhesion and bearing layers 316 and 326. Accordingly, the layer of material is preferably Cr—Au. The formation of the Cr—Au layer may be by any suitable technique such as evaporation or sputter deposition.

At step 206, the areas for the adhesion layers are patterned using standard lithography techniques. Specifically, the adhesion layers are patterned for the components that are fixed to the substrate (e.g., the contact supports 282 and 284, the electrodes 292–298, the retainer walls 310 and 324, and the bonding pads).

At step 208, a layer of gold (Au) is formed for the bonding pads 100–108. The formation of the bonding pads is done via standard lithography techniques. Preferably, the gold layer has a thickness of approximately one to two microns.

At step 210, a copper layer is formed over the entire substrate 14. Preferably, the copper layer is approximately two to three microns deep, and is provided via evaporation or sputter deposition. Portions of the copper layer are selectively removed at step 212. Specifically, the Cu film or layer is removed at the locations of the electrodes 292–298, the contact supports 282 and 284, and the retainer walls 314 and 324. The removal of the copper material may be by any suitable technique such as standard lithography etching.

A thin layer of Cu is formed in the areas bounded by the retainer walls 314 and 324 (step 214). The layer provides a removal layer that the support portions 258 and 260 are constructed upon. When the Cu material is subsequently removed (etched, see step 226 below), the support portions 258 and 260 are freed from attachment to the substrate 242 and components fixed to the substrate.

At step 216, a photoresist is formed and patterned to provide areas for the IMM 244 (i.e., the mass platform 248, and the support portions 258 and 260), the electrodes 292–298, the contact supports (e.g., 282 and 284), and the retainer walls 314 and 324. The photoresist layer is preferably 10–15 $\mu$m thick. A layer of metal (preferably nickel) is formed in the pattern provided by the photoresist at step 218. Preferably, the formation of the nickel layer is by plating and is provided to a depth of 10–12$\mu$m. Accordingly, at step 218, many of the components of the safing switch 240 are formed. It should be noted that the optional holes 252 through the head portion 250 of the mass platform 248 are formed via appropriate patterning at step 216 followed by the formation of the nickel layer at appropriate locations at step 218. The holes 252 formed at step 218 make it easier to remove the Cu layer from under head portion 250 during the final processing step.

At step 220, portions of the photoresist are removed at the locations of the contact pairs 268–274. Specifically, the photoresist is removed to provide an area for formation of the contact members (e.g., 276) and the second halves (e.g., 278 and 280). Preferably, the removal of the photoresist is by exposure and is done to a depth of approximately one-half (½) to three-fourths (¾) of the height of the plated nickel in which the contacts are to be formed.

At step 222, a layer of gold is formed to provide the contact pairs in the areas exposed within the photoresist. At step 224, the vertical retainer members 318 and 328 are formed. The formation of the vertical retainer members 318, 328 may be by any suitable technique such as utilizing two lithography steps. The first step includes pattern plating a second copper layer to define the regions where the vertical retainer members 318, 328 are to be formed. The second lithography step includes plating a layer of nickel into the pattern to form the vertical retainer members 318, 328.

At step 226, the photoresist and the copper materials are removed. The removal of the resist and the copper frees the IMM 244. In particular, the thin layer of Cu is removed from beneath the tips 262, 264 of the support portions 258, 260. Thus, the support portions 258, 260 can move (e.g., slide and tip) on the adhesion and bearing layers 316, 326, respectively. The removal of the material may be by any suitable technique such as etching. Also, the removal of the copper exposes the vertical retainer members 318, 328.

Although the present invention has been described in considerable detail with reference to certain preferred versions thereof, it will be appreciated by those skilled in the art that various rearrangements or alterations of parts may be made without departing from the spirit and scope of the present invention, as defined in the appended claims.

Having described the present invention, the following is claimed:

1. A micro-miniature acceleration switch comprising:
    a substrate having a planar surface;
    an inertial mass member ("IMM") fabricated upon said substrate and transversely movable relative to said substrate from a first position to a second position when said switch is accelerated along at least one direction parallel to said planar surface of said substrate by acceleration of sufficient magnitude; and
    electrical contacts fabricated upon said substrate, at least one of which is coupled to said IMM, for moving between closed and open positions when said IMM moves between said first position and said second position;
    said IMM including a support portion that engages said substrate and that slides relative to said substrate, said transverse movement of said IMM when said switch is accelerated along said at least one direction including a sliding movement of said support portion on said substrate.

2. A switch as set forth in claim 1 including retainer means for limiting an amount of the sliding movement of said IMM.

3. A switch as set forth in claim 1 including a wall extending from said substrate, said wall bounding an area within which said support portion is located and within which said support portion can slide parallel to said substrate.

4. A switch as set forth in claim 1 including retainer means for preventing removal of said IMM away from said substrate in a direction perpendicular to said planar surface.

5. A switch as set forth in claim 1, wherein said IMM includes two support portions, each of said two support portions engages said substrate and can slide relative to said substrate, said transverse movement of said IMM when said switch is accelerated along said at least one direction includes a sliding movement of each of said support portions on said substrate.

6. A switch as set forth in claim 5, wherein said IMM is elongate in a direction parallel to said substrate, a first of said support portions is located adjacent to a first end of said IMM, a second of said support portions is located adjacent to a second end of said IMM, said IMM has a mass portion located between said first and second ends.

7. A switch as set forth in claim 6, wherein said electrical contacts include four pairs of electrical contacts, one contact of each of said four pairs of contacts is coupled to said IMM and the other of each of said four pairs of contacts is fixed relative to said substrate.

8. A switch as set forth in claim 7, wherein two of said electrical contact pairs are positioned between said first end and said mass portion, and two of said electrical contact pairs are positioned between said second end and said mass portion.

9. A switch as set forth in claim 1, wherein said electrical contacts include first and second pairs of electrical contacts, one contact of each of said first and second pairs of contacts is coupled to said IMM and the other of each of said first and second pairs of contacts is fixed relative to said substrate.

10. A switch as set forth in claim 9, wherein said first pair of electrical contacts engage when said IMM moves from said first position to said second position, said IMM is movable from a third position to a fourth position when the switch is accelerated along a direction opposite to said at least one direction, said second pair of electrical contacts engage when said IMM moves from said third position to said fourth position.

11. A switch adjustably responsive to an acceleration force, said switch comprising:
    a substrate having a planar surface;
    an inertial mass member ("IMM") slidable relative to said substrate from a hold position to an actuated position, said IMM relatively sliding when said switch is accelerated along at least one direction parallel to said planar surface of said substrate and being moved out of the hold position in response to said switch acceleration of sufficient magnitude;
    electrical contacts, at least one of said contacts is coupled to said IMM, for moving between closed and open positions when said IMM slides between said hold position and said actuated position;
    hold means comprising at least one hold electrode to which a hold voltage may be applied for adjustably establishing an electrostatic field creating a restraining force urging the IMM into the hold position, said restraining force having a magnitude functionally related to said hold voltage; and
    means for applying a hold voltage to said hold electrode; and
    wherein said IMM remains in said hold position when said switch is subjected to acceleration force along said at least one direction that is insufficient to overcome force tending to restrain said IMM to said hold position, including the restraining force established by said electrostatic field, and slides to said actuated position when said switch is subjected to acceleration force along said at least one direction that is sufficient to overcome said force tending to restrain said IMM,
    whereby the acceleration along said at least one direction required to move relatively said IMM from said hold position to said actuated position may be adjusted by selecting the hold voltage applied to said hold means.

12. A switch as set forth in claim 11 further comprising means for adjusting said restraining force of said hold means by varying said hold voltage.

13. A switch as set forth in claim 11, wherein said hold electrode is disposed on said substrate, and is adjacent to said IMM.

14. A switch as set forth in claim 11, wherein said IMM is formed of an electrically conductive material.

15. A switch as set forth in claim 11, wherein said electrical contacts close when said IMM is moved by acceleration of sufficient magnitude in the at least one direction.

16. A switch as set forth in claim 11, wherein said electrical contacts comprise first and second pairs of electrical contacts, with one contact of each of said first and second pairs being coupled to said IMM for movement therewith and the other contact of each of said first and second pairs being coupled to said substrate.

17. A switch as set forth in claim 16, wherein said at least one direction includes a first direction, one of said pairs of electrical contacts is positioned on one side of said IMM and closes when said IMM moves in the first direction relative to said substrate, and the other of said pairs of electrical contacts is positioned on another side of said IMM and closes when said IMM moves in a second direction relative to said substrate, the second direction is opposite to the first direction.

18. A switch as set forth in claim 11, wherein said IMM comprises plated metal.

19. A switch as set forth in claim 18, wherein said plated metal is plated nickel.

20. A method of making a micro-miniature acceleration switch, said method comprising:
providing a substrate having a planar surface;
fabricating an inertia mass member ("IMM") upon the substrate such that the IMM is free to slide at least a predetermined distance along the substrate when the switch is accelerated along at least one direction parallel to the planar surface of the substrate by acceleration of sufficient magnitude;
fabricating electrical contacts upon the substrate such that at least one electrical contact is coupled with the IMM, and at least one contact is adjacent to the IMM and coupled with the substrate, and such that the contacts are relatively movable between closed and open positions when the IMM moves between first and second positions.

21. A method as set forth in claim 20, wherein said step of fabricating the IMM includes creating a pattern of the IMM in a first material, providing a second material for the IMM into the pattern, and removing the first material.

22. A method as set forth in claim 21, wherein said step of creating a pattern of the IMM includes patterning the IMM in a photoresist layer as the first material, said step of providing a second material includes depositing metal into the pattern defined within the photoresist.

23. A method as set forth in claim 20, wherein said step of fabricating the IMM includes providing a layer of a first material onto the substrate, providing a second material for the IMM, and removing the first material such that the IMM is free to move relative to the substrate.

24. A method as set forth in claim 20, wherein said step of fabricating the IMM includes forming a portion of the IMM that engages a surface in sliding contact during acceleration of the switch.

25. A method as set forth in claim 24 including providing an intermediate layer of material between the substrate and the portion of the IMM that engages a surface such that the portion of the IMM slides upon the intermediate layer.

26. A system for recognizing the onset of a crash of a vehicle and providing a control signal indicative thereof, comprising:
an accelerometer responsive to crash acceleration of said vehicle for providing a crash acceleration signal which varies as a continuous function of said crash acceleration;
microprocessor means responsive to the crash acceleration signal for determining from said signal whether said vehicle is experiencing a crash condition; and
a safing switch responsive to crash acceleration of said vehicle, said safing switch comprising:
a substrate having a planar surface;
an inertial mass member ("IMM") fabricated upon said substrate and movable relative to said substrate in a direction across said substrate from a first position to a second position when said switch is accelerated along at least one direction parallel to said planar surface of said substrate by acceleration of sufficient magnitude; and
electrical contacts fabricated upon said substrate, at least one of which is coupled to said IMM, for moving between closed and open positions when said IMM moves between said first position and second positions;
said IMM including a support portion that engages said substrate and that slides relative to said substrate, said movement of said IMM when said switch is accelerated along said at least one direction including a sliding movement of said support portion on said substrate.

27. A system as set forth in claim 26 including hold means responsive to a voltage for applying an electrostatic force to said IMM to bias said IMM into said first position, and
means for applying a voltage to said hold means to thereby establish a magnitude of the bias on said IMM and thus the predetermined vehicle crash acceleration necessary to force said IMM from said first position to said second position; and
means responsive to said microprocessor means and to said electrical signal provided by said electrical contact means for providing said control signal in accordance therewith.

28. The system as set forth in claim 26 including an occupant protection device for protecting a vehicle occupant upon a crash of the vehicle, said occupant protection device being responsive to said control signal for controlling the operation of said device.

29. The system as set forth in claim 28, wherein the occupant protection device includes an air bag.

30. A method of deploying an occupant protection apparatus in a vehicle as a function of the crash acceleration experienced by said vehicle comprising the steps of:
providing a control circuit for assessing changes in the acceleration experienced by said vehicle, said control circuit including a safing switch having an inertial mass member ("IMM") slidable relative to a planar-extending substrate upon which the IMM is fabricated, said IMM sliding in a plane parallel to the extent of said substrate in response to a predetermined crash acceleration applied to said control circuit in a direction parallel to the extent of said substrate and above a predetermined amount to generate an electrical signal indicating a crash event;

applying an electrostatic force to said IMM to urge said IMM in the direction opposite the direction of acceleration movement of said safing switch, said applied electrostatic force being selected according to the predetermined level of acceleration to which said switch is to be responsive;

generating an electrical signal when said IMM slides in response to acceleration of said switch greater than said predetermined crash acceleration level; and actuating said occupant crash protection apparatus when said electrical signal is being generated by said IMM.

* * * * *